US007366316B2

(12) United States Patent
Reithinger

(10) Patent No.: US 7,366,316 B2
(45) Date of Patent: Apr. 29, 2008

(54) DEVICE TO TRANSMIT AND RECEIVE DATA FOR REMOTE CONTROL OF HEARING DEVICES

(75) Inventor: Juergen Reithinger, Nuremberg (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 650 days.

(21) Appl. No.: 10/771,893

(22) Filed: Feb. 4, 2004

(65) Prior Publication Data

US 2004/0235427 A1 Nov. 25, 2004

(51) Int. Cl.
*H04R 25/00* (2006.01)
*H04R 5/00* (2006.01)
*H04B 5/00* (2006.01)

(52) U.S. Cl. .................... 381/331; 379/314; 455/41.1; 455/41.2; 455/41.3; 455/82; 455/87; 381/78; 381/326

(58) Field of Classification Search .................... 381/7, 381/8, 326, 331; 340/310.16, 310.17; 455/41.1, 455/41.2, 41.3, 82, 180.4
See application file for complete search history.

(56) References Cited

U.S. PATENT DOCUMENTS

| | | | | |
|---|---|---|---|---|
| 3,365,670 | A * | 1/1968 | Sheffet | 455/308 |
| 5,317,330 | A * | 5/1994 | Everett et al. | 343/867 |
| 6,041,129 | A | 3/2000 | Adelman | |
| 6,229,443 | B1 * | 5/2001 | Roesner | 340/572.1 |
| 6,584,301 | B1 * | 6/2003 | Bohn et al. | 455/41.1 |

FOREIGN PATENT DOCUMENTS

| | | |
|---|---|---|
| DE | 44 31 446 | 10/1996 |
| DE | 201 14 461 | 12/2001 |
| EP | 1 231 819 | 8/2002 |
| GB | 1 347 808 | 2/1974 |

OTHER PUBLICATIONS

Data Sheet XE1209 for Ultra Low Power CMOS Transceiver, no date.

* cited by examiner

*Primary Examiner*—Wayne Young
*Assistant Examiner*—Dionne H Pendleton
(74) *Attorney, Agent, or Firm*—Schiff Hardin LLP

(57) ABSTRACT

A device to transmit and receive data for remote control of hearing devices has a reduced size achieved by the transmitter coils of the transmitter and the receiver coil of the receiver being wound around a common, shared core. Moreover, a protective capacitor that is used to protect the receiver is at the same time used as a correction capacitor to correct the resonant frequency of a reception oscillator circuit.

6 Claims, 1 Drawing Sheet

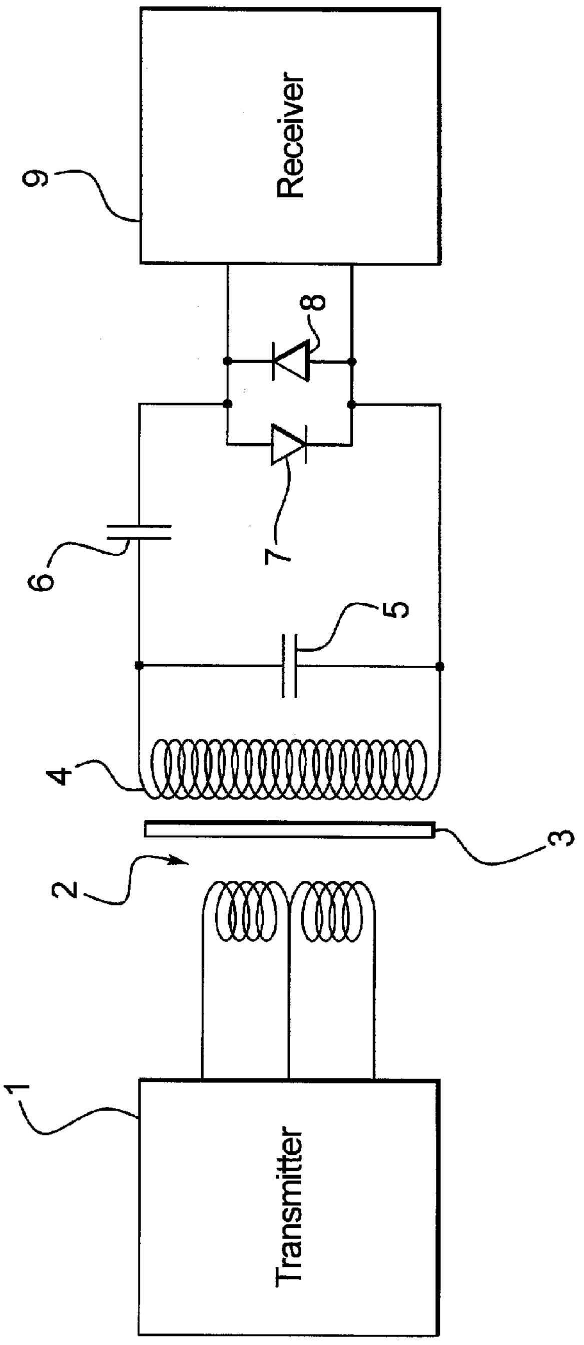
Receiver
9
8
7
6
5
4
3
2
1
Transmitter

DEVICE TO TRANSMIT AND RECEIVE DATA FOR REMOTE CONTROL OF HEARING DEVICES

BACKGROUND OF THE INVENTION

1. Field of the Invention

The present invention concerns a device to transmit and receive data for remote control of hearing devices, of the type having a transmission device with a transmitter coil to transmit data and a reception device with a reception coil to receive data.

2. Description of the Prior Art

A device of the above type is known from German OS 201 14 461, which serves as a transmission and/or reception unit for a hearing device for wireless data transmission between the hearing device and at least one external device. A number of transmission and/or reception coils are aligned in differing spatial directions.

Moreover, transponder antenna devices are known from German OS 44 31 446, in which a number of coils are used that are magnetically narrowly coupled with one another. Two or more coils that are arranged at a common core are thereby used for data transmission.

To transmit and receive signals in transceivers, coils preferably are used for the long-wave range, since signals in the long-wave range are predominantly inductively transmitted. Sufficiently strong fields must be generated for the inductive transmission.

It is technically difficult to realize, with sufficient transmission power, an oscillating circuit that is strongly energized from the outside with a fixed frequency when only very low supply voltages are available (as is the case, for example, in the remote control of hearing devices). For a strong field, a coil with many windings is necessary in order to achieve a sufficient field strength, but such coils have a high inductivity, and thus also a high alternating current impedance. The current that can be sent by the coil thus is significantly reduced, since the maximum current through the coil results from the quotient of the supply voltage and alternating current impedance.

In particular, coils with the most possible windings are necessary for the receiving circuit in order to generate the largest possible voltage from relatively weak fields. Such coils, however, are particularly poorly suited as transmitter coils to generate strong fields given low supply voltages. This problem ensues very particularly in the case of radio connections between two devices when relatively low frequencies are used, in the range of, for example, 50 to 500 kHz.

For a sufficiently high range of radio remote control, appropriately strong transmission fields are necessary. Should the radio remote control also be fashioned to receive data, a further coil or a further winding is additionally required for the reception. Such a receiver coil is, however, strongly overloaded (overdriven) by the field of the transmitter coil. Without protection, such as assembly can lead to the destruction of the receiver input stage.

To circumvent this problem, freely oscillating oscillator circuits can be used that re-excite themselves, and in which the voltages and therewith also the currents build up to higher values. Such oscillator circuits, however, oscillate at their resonant frequency and not exactly with the externally predetermined, desired frequency. As an alternative to this solution, the supply voltage can be distinctly increased in order to be able to force higher currents through the transmitter coil.

SUMMARY OF THE INVENTION

An object of the present invention is to provide a device to transmit and receive data for remote control of hearing devices in which the transmission power is sufficiently high, given the constraint of a limited available supply voltage.

This object is inventively achieved in accordance with the invention by a device to transmit and receive data for remote control of hearing devices, with a transmission device that has a transmitter coil to transmit data and a reception device that has a receiver coil to receive data, wherein the transmitter coil and the receiver coil have a common core, so that the receiver coil can be energized to transmit by the transmitter coil.

It is an advantage of the invention that two coils that are independent of one another do not have to be wound around two coil cores. Instead of this, all necessary coils can be wound around a single core. Space that can be saved. In small remote controls, there is little space for the relatively large coils in the frequency range of 50 to 200 kHz. The avoidance of an "extra" core enables a significantly smaller volume for the remote control, or in general for the transmitter and receiver.

Since the receiver coil normally possesses a substantially higher number of windings than the transmitter coil, very strong transmission fields can be generated without technical effort although only very low operating voltages are available. Therefore, no additional voltage boosters are necessary, and a battery with lower voltage can be used, or fewer batteries have to be circuited in series, also resulting in a space saving.

The combination of the transmitter and receiver coils on one core is ultimately cheaper in the production than two completely separate coils.

The reception device can have a receiver from which the receiver coil is separated by a protective circuit. This should be undertaken in order to protect the receiver from excessive voltages that can result from the transformation effect of transmitter and receiver coil. The protective circuit preferably is formed by of a capacitor and a parallel circuit of two opposite polarity diodes connected in series therewith. This prevents excessively high voltages from reaching the receiver at the input of which the diode parallel circuit is connected.

The reception and transmission devices preferably are fashioned for a frequency range of 50 to 200 kHz. This frequency range is approved for remote controls.

The reception device can have a reception oscillator circuit, with the receiver coil forming the oscillator circuit coil. The reception oscillator circuit is in particular used as a transmission power amplifier.

The reception device should have a correction capacitor to correct the resonant frequency of the reception oscillator circuit. The frequency changes that are caused by the inductivities of the transmitter coils thus can be compensated. The protective capacitor from the protective circuit is at the same time used as a correction capacitor, such that an additional component can be saved.

DESCRIPTION OF THE DRAWINGS

The FIGURE is a circuit diagram of an embodiment of the inventive transmission device.

DESCRIPTION OF THE PREFERRED EMBODIMENTS

The exemplary embodiment described herein represents a preferred embodiment of the present invention.

According to the circuit shown in the FIGURE, the transmitter 1 is equipped with one or more transmitter coils 2. The transmitter coils 2 are coupled with a receiver coil 4 by a common, shared core 3. An oscillator circuit capacitor 5 is connected in parallel to the receiver coil. A protective circuit, formed by a protective capacitor 6 and a parallel circuit of two opposite polarity diodes 7 and 8 connected in series therewith, is connected to both poles of the oscillator circuit. The diodes 7 and 8 connected in parallel are connected to the input of a receiver 9.

The functioning of this circuit is explained in detail in the following. The necessarily separate receiver coil 4 is wound on the same core 3 on which the transmitter coils 2 are also wound. The receiver coil 4 that, with its associated capacitor 5, represents a complete oscillator circuit, is energized to oscillate by the transmitter coils 2. Since the receiver coil 4 has more windings in comparison to the transmitter coils 2, during the transmission event relatively high voltages are generated in the reception oscillating circuit 4, 5 that also, in spite of the many windings, again generate quite high currents by the oscillation effect of the oscillator circuit. The actual transmitter coils 2 still deliver only the radiated energy. Therefore, not as much current needs to flow through these coils 2. The strong transmission field is not generated by the receiver coil 4 energized by the transmitter coils 2. Due to the excitation via the transmitter coils 2, which are externally controlled, the frequency is also absolutely stable and can be externally predetermined. Tolerances of the components on the oscillator circuit also have no influence on the transmission frequency. They affect only the efficiency of the transmitter 1 to a known degree.

The inductivity of the coupled receiver coil 4 is changed by the inductivities of the transmitter coils 2, such that the resonant frequency of the oscillating circuit 4, 5 must be corrected by changing of the associated capacitance value of the oscillator circuit capacitor 5. The inductivity of the oscillating circuit is smaller, meaning the capacity of the oscillator circuit must be increased. A capacitance suitable for this can be connected without problems, such that it serves at the same time as a protection for the sensitive receiver input stage 9. Since such a protective circuit 6, 7, 8 would have been necessary anyway, this circuit solution does not require additional components. The protective circuit 6, 7, 8 includes only the correction capacitor 6 and the two diodes 7 and 8 that are connected in parallel to the capacitor 5 of the receiver oscillator circuit. The reception signals are tapped at the diodes 7, 8. Given the high voltages generated in the transmission operation, typically of approximately 50 Volts, the diodes 7, 8 become conductive and thus connect the capacitor 6 preceding them in parallel with the oscillator circuit capacitor 5 of the reception circuit. The resonant frequency of the oscillating circuit 4, 5 is thereby corrected for the transmission operation. At the same time, at the input of the high-resistance receiver the signals are limited by the diodes 7, 8 to a maximum of approximately 0.7 Volts. The majority of the voltage generated by the oscillator circuit then drops at the protective capacitor 6.

In the reception operation, the reception signals are so small that the diodes 7, 8 are blocking. The voltages of the received signals typically reach at most the mV range. Only the original oscillator circuit capacitor 5 is thereby still active. The transmitter coils 2 are deactivated at the same time. This means that at least one connection of each transmitter coil 2 is open. They thus no longer affect the reception oscillator circuit 4, 5, which can freely oscillate at its reception frequency to which it is tuned. The signal is thus further transmitted to the protective diodes 7, 8, approximately without loss, via the protective/correction capacitor 6. Due to the low reception voltage, these diodes 7, 8 are non-conducting. This means that the reception voltage can be accepted at the diode connections to the full extent by the high-resistance receiver input.

In addition to the advantage that the receiver coil is used as a transmission amplifier, the presented circuit also possesses the advantage of a reduced space requirement, since a common core is used for the transmitter and receiver coil and the protective capacitor is simultaneously used as a correction capacitor.

Although modifications and changes may be suggested by those skilled in the art, it is the intention of the inventor to embody within the patent warranted hereon all changes and modifications as reasonably and properly come within the scope of his contribution to the art.

I claim as my invention:

1. A device for transmitting and receiving data for remotely controlling a hearing device, comprising:

a transmission device comprising a transmitter coil to transmit data;

a reception device comprising a receiver coil for receiving data;

a common ferromagnetic core on which both said transmitter coil and said receiver coil are wound, also causing said receiver coil to be excited for transmission of data by said transmitter coil;

said reception device comprising a reception oscillator circuit with said receiver coil forming an oscillator circuit coil for said oscillator circuit;

said transmission coil having an inductance associated therewith and said reception oscillator circuit having a resonant frequency; and said reception device comprising a correction capacitor that corrects the frequency of the reception oscillator circuit upon deviation from said resonant frequency caused by said inductance of said transmission coil.

2. A device as claimed in claim 1 wherein said reception device comprises a receiver circuit, and a protective circuit connected between said receiver circuit and said receiver coil to separate said receiver circuit from said receiver coil.

3. A device as claimed in claim 2 wherein said protective circuit comprises a capacitor and a parallel circuit of two diodes connected with opposite polarity, said capacitor being connected in series with said parallel circuit.

4. A device as claimed in claim 2 wherein said protective circuit is connected in parallel with said receiver coil.

5. A device as claimed in claim 1 wherein said reception device and said transmission device each operate in a frequency range of between 50 kHz and 200 kHz.

6. A device as claimed in claim 1 wherein said reception device comprises a receiver circuit and a protective circuit connected between said receiver circuit and said reception coil to separate said receiver circuit from said receiver coil, said protective circuit comprising said correction capacitor and a parallel circuit of two diodes connected with opposite polarity, said correction capacitor being connected in series with said parallel circuit.

* * * * *